(12) United States Patent
Simpson et al.

(10) Patent No.: US 11,635,610 B2
(45) Date of Patent: *Apr. 25, 2023

(54) SYSTEMS AND METHODS FOR IMAGING A SAMPLE

(71) Applicant: Purdue Research Foundation, West Lafayette, IN (US)

(72) Inventors: Garth Jason Simpson, West Lafayette, IN (US); James Ulcickas, West Lafayette, IN (US); Fengyuan Deng, Watertown, MA (US); Changqin Ding, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,903

(22) Filed: May 18, 2021

(65) Prior Publication Data
US 2021/0278656 A1 Sep. 9, 2021

Related U.S. Application Data

(63) Continuation of application No. 16/713,838, filed on Dec. 13, 2019, now Pat. No. 11,042,019.

(60) Provisional application No. 62/780,576, filed on Dec. 17, 2018.

(51) Int. Cl.
| | |
|---|---|
| *G02B 21/36* | (2006.01) |
| *G01N 21/21* | (2006.01) |
| *G06T 5/00* | (2006.01) |
| *G02B 21/26* | (2006.01) |
| *G02B 21/06* | (2006.01) |

(52) U.S. Cl.
CPC .......... *G02B 21/367* (2013.01); *G01N 21/21* (2013.01); *G02B 21/06* (2013.01); *G02B 21/26* (2013.01); *G06T 5/005* (2013.01); *G06T 2207/10056* (2013.01); *G06T 2207/20212* (2013.01)

(58) Field of Classification Search
CPC ...... G02B 21/367; G02B 21/06; G02B 21/26; G02B 5/3016; G02B 5/3083; G02B 21/0032; G02B 21/0068; G02B 21/14; G01N 21/21; G01N 21/636; G06T 5/005; G06T 2207/10056; G06T 2207/20212
USPC .......................................................... 348/79
See application file for complete search history.

(56) References Cited

U.S. PATENT DOCUMENTS

| | | | | |
|---|---|---|---|---|
| 2007/0211256 A1* | 9/2007 | Medower | ........... | G01B 9/02065 356/491 |
| 2007/0263226 A1* | 11/2007 | Kurtz | ..................... | G01N 21/21 356/492 |
| 2011/0029049 A1* | 2/2011 | Vertikov | ............ | A61B 5/14558 607/104 |

(Continued)

*Primary Examiner* — Gims S Philippe
(74) *Attorney, Agent, or Firm* — Purdue Research Foundation

(57) ABSTRACT

A method for imaging a sample, wherein the sample changes a polarization state of light as a function of position, wherein the method includes changing a polarization state of a purely polarized light of an incident light striking a micro-retarder array, thereby inducing a changed polarization state of the polarization state. The micro-retarder array is placed in a rear conjugate focal plane of a microscope. The method additionally includes projecting the changed polarization state of the polarization state into an object plane of the microscope containing the sample.

10 Claims, 4 Drawing Sheets

(56) References Cited

U.S. PATENT DOCUMENTS

| | | | | |
|---|---|---|---|---|
| 2013/0188160 A1* | 7/2013 | Ruoff | ............... | G03F 7/70141 |
| | | | | 355/52 |
| 2013/0293793 A1* | 11/2013 | Lu | ............... | G09G 3/342 |
| | | | | 349/61 |
| 2014/0268745 A1* | 9/2014 | Van de Ven | ............... | F21V 29/507 |
| | | | | 362/249.02 |
| 2016/0187698 A1* | 6/2016 | Kobayashi | ............... | G02F 1/13363 |
| | | | | 349/33 |
| 2016/0199935 A1* | 7/2016 | Chen | ............... | G01J 3/12 |
| | | | | 219/121.61 |
| 2020/0110029 A1* | 4/2020 | Lei | ............... | G01N 21/211 |

* cited by examiner

SYSTEMS AND METHODS FOR IMAGING A SAMPLE

CROSS-REFERENCE TO RELATED APPLICATIONS

The present U.S. Patent Application is related to and claims the priority benefit of U.S. patent application Ser. No. 16/713,838, filed Dec. 13, 2019, which further claims the priority benefit of U.S. Provisional Patent Application Ser. No. 62/780,576, filed Dec. 17, 2018, the contents of which is hereby incorporated by reference in its entirety into this disclosure.

ACKNOWLEDGEMENT OF GOVERNMENT SUPPORT

This invention was made with Government support under Grant No. 1412888-CHE between Purdue University and the National Science Foundation; Grant No. R01GM103401 between Purdue University and National Institutes of Health; and Grant No. 1710475 between Purdue University and National Science Foundation. The Government has certain rights in the invention.

TECHNICAL FIELD

This disclosure relates to systems and methods for imaging a sample.

BACKGROUND

This section introduces aspects that may help facilitate a better understanding of the disclosure. Accordingly, these statements are to be read in this light and are not to be understood as admissions about what is or is not prior art.

Polarization-dependent nonlinear optical microscopy provides rich structural information on local orientation and structure. In nonlinear optical interactions, the greater number of fields involved in the process substantially increases the accessible information content relative to analogous linear optical effects. For this reason, polarization-dependent second harmonic generation (SHG) is routinely used for structural characterization of collagen and other ordered fibrillar assemblies in biological microscopy. The polarization dependence of SHG can also inform polymorphism in microscopy of crystalline materials.

Polarization analysis is particularly beneficial for detection of multiple domains and/or defects within protein microcrystals prior to X-ray diffraction (XRD) measurements. XRD is the most widely used approach for high-resolution protein structure determination, which in turn informs the structure/function relationships underpinning rational drug design. The majority of the structures currently added to the protein data bank are currently solved using data collected at synchrotron facilities, by nature of the high X-ray fluence available for diffraction analysis. Previous studies have demonstrated selective detection of multiple crystalline domains within protein crystals by polarization-dependent second harmonic generation imaging. The presence of multiple domains can greatly complicate protein structure determination based on XRD, since the measured scattering patterns will generally contain superpositions of reflections from each of the different domains with no trivial methods available for disentangling the different contributions. Consequently, there is a clear benefit to ensuring the presence of well-ordered single-domain crystals prior to performing diffraction measurements at synchrotron facilities.

While conceptually simple, the most common approaches for modulating polarization are generally slow (e.g., the use of waveplates in rotation stages). The considerable 1/f noise can greatly reduce the precision of the polarization measurements, complicating quantitative polarization analysis at the level of single pixel or single microparticle. Slow polarization rotation can also introduce bias from sample bleaching or slow drift in the detector/microscope. In addition, the time required for polarization modulation based on physical rotation of optics can complicate applications in which speed is essential, including high-throughput studies and in vivo measurements.

More recently, high-speed (8 MHz) time-dependent polarization modulation has enabled tensor imaging at up to video-rate by nonlinear optical Stokes ellipsometry (NOSE). In brief, the incident beam was passed through an electro-optic modulator operating at a subharmonic of the laser repetition rate (e.g., 8 MHz modulation for an 80 MHz laser). Synchronous digitization enabled bookkeeping to track and record the intensities observed for the horizontally and vertically polarized SHG produced by each of the unique incident polarization states at each location. The resulting set of 20 images (one for each incident polarization state for both the horizontal and vertical laboratory-frame polarizations) were then iteratively used to determine the local-frame orientation and local-frame tensor elements at each location. In this manner, the reduction in 1/f noise from high speed modulation enabled meaningful polarization measurements at each pixel of complex structures at up to video-rate (15 fps) acquisition speeds for 512×512 images. However, NOSE microscopy is challenging to retrofit into existing instrumentation targeting protein microcrystal analysis. The two conventional instrumental platforms include commercial beam-scanning systems for automated SHG and two-photon excited ultraviolet fluorescence (TPE-UVF) imaging of 96-well plates (Formulatrix) and a custom system integrating SHG and TPE-UVF microscopy into a synchrotron XRD beamline (Argonne National Laboratory). Both systems have compact beampaths with no simple access locations for addition of relatively bulky high-speed modulators (e.g. electro-optic modulators).

SUMMARY

Various embodiments of the present disclosure relate to using a micro-retarder array to pattern a polarization-dependent mask within the field of view using entirely passive optical elements. In one or more embodiments, a patterned micro-retarder array is placed in the rear conjugate plane of the microscope which results in variation in the polarization state during beam-scanning imaging that is reproduced in the sample plane.

One aspect of the present disclosure relates to a method for imaging a sample, wherein the sample changes a polarization state of light as a function of position, wherein the method includes changing a polarization state of a purely polarized light of an incident light striking a micro-retarder array, thereby inducing a changed polarization state of the polarization state. The micro-retarder array is placed in a rear conjugate focal plane of a microscope. The method additionally includes projecting the changed polarization state of the polarization state into an object plane of the microscope containing the sample.

Another aspect of the present disclosure relates to a method for imaging a sample, wherein the method includes changing a polarization state of a purely polarized light of an incident light striking a micro-retarder array, thereby inducing a changed polarization state of the polarization state. The micro-retarder array is placed in a rear conjugate focal plane of a microscope. Additionally, the method includes projecting the changed polarization state of the polarization state into an object plane of the microscope containing the sample. Further, the method includes translating the sample through a pattern of polarizations induced by the micro-retarder array to interrogate each location of the sample with multiple polarizations. Moreover, the method includes performing second harmonic generation of the purely polarized light. The method additionally includes imaging the sample.

Still another aspect of the present disclosure relates to a method for imaging a sample, wherein the method includes changing a polarization state of a purely polarized light of an incident light striking a micro-retarder array, thereby inducing a changed polarization state of the polarization state. The micro-retarder array is placed in a rear conjugate focal plane of a microscope. Additionally, the method includes projecting the changed polarization state of the polarization state into an object plane of the microscope containing the sample. Furthermore, the method includes translating the sample through a pattern of polarizations induced by the micro-retarder array to interrogate each location of the sample with multiple polarizations. Moreover, the method includes determining a Stokes and Mueller set of parameters, wherein the Stokes and Mueller set of parameters dictate a linear polarization transfer properties of the sample. The method additionally includes imaging the sample.

One more aspect of the present disclosure relates to a method for imaging a sample, wherein the method includes changing a polarization state of a purely polarized light of an incident light striking a micro-retarder array, thereby inducing a changed polarization state of the polarization state. The micro-retarder array is placed in a rear conjugate focal plane of a microscope. Additionally, the method includes projecting the changed polarization state of the polarization state into an object plane of the microscope containing the sample. Moreover, the method includes translating the sample through a pattern of polarizations induced by the micro-retarder array to interrogate each location of the sample with multiple polarizations. Further, the method includes determining a Stokes and Mueller set of parameters, wherein the Stokes and Mueller set of parameters dictate a linear polarization transfer properties of the sample. The method additionally includes imaging the sample.

BRIEF DESCRIPTION OF DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

DETAILED DESCRIPTION

Figure 1:
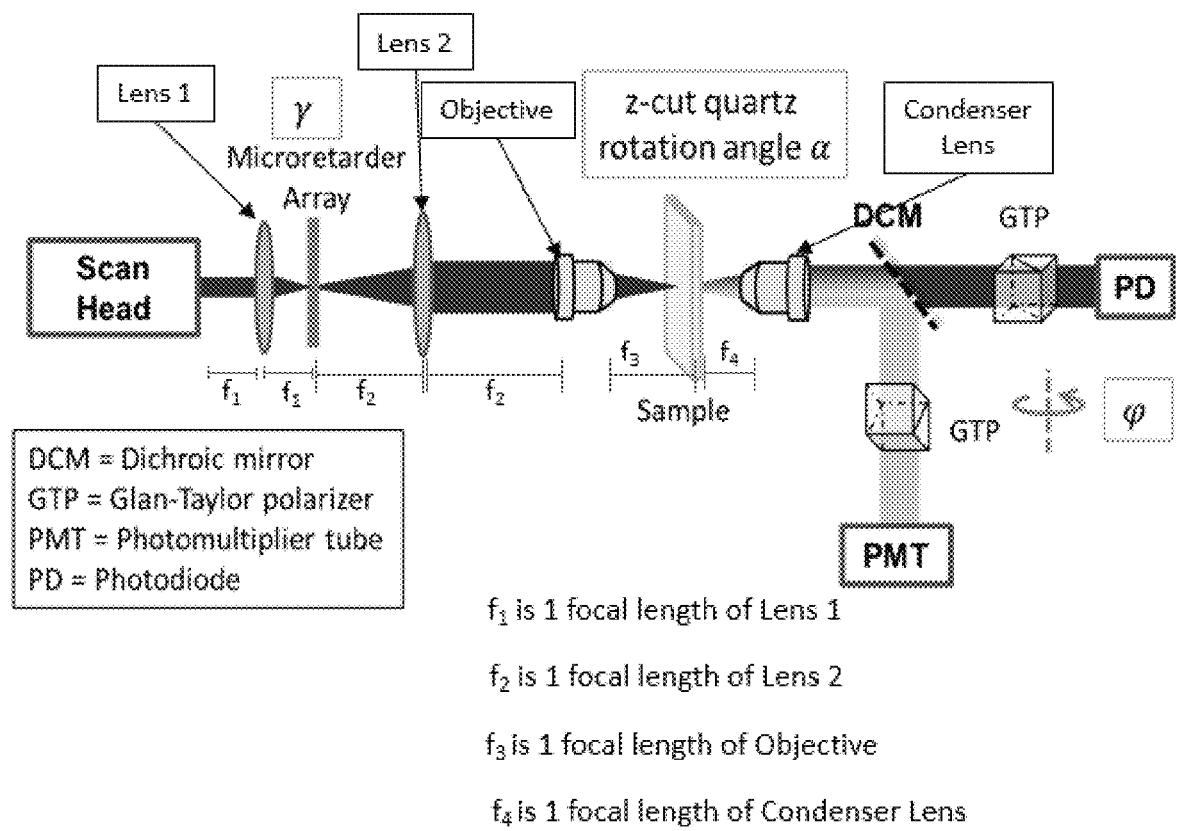
FIG. 1 illustrates a micro-retarder array placed in a rear conjugate plane of a microscope, in accordance with one or more embodiments.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended.

Various embodiments of the present disclosure related to a patterned microretarder array positioned in the rear conjugate plane of a microscope that enables rapid polarization-dependent nonlinear optical microscopy. The pattern introduced to the array results in periodic modulation of the polarization-state of the incident light as a function of position within the field of view with no moving parts or active control. Introduction of a single stationary optical element and a fixed polarizer into the beam of a nonlinear optical microscope enables nonlinear optical tensor recovery, which informs on local structure and orientation. Agreement was observed between the measured and predicted second harmonic generation (SHG) of z-cut quartz, selected as a test system with well-established nonlinear optical properties. Subsequent embodiments of spatially varying samples further support the general applicability for detailed polarization analysis in both conventional and nonlinear optical imaging of structurally diverse samples.

Example 1: A method for imaging a sample, wherein the method includes changing a polarization state of a purely polarized light of an incident light striking a micro-retarder array, thereby inducing a changed polarization state of the polarization state. The micro-retarder array is placed in a rear conjugate focal plane of a microscope. Further, the method includes projecting the changed polarization state of the polarization state into an object plane of the microscope containing the sample. Additionally, the method includes translating the sample through a pattern of polarizations induced by the micro-retarder array to interrogate each location of the sample with multiple polarizations. Moreover, the method includes performing second harmonic generation of the purely polarized light. The method additionally includes imaging the sample.

In some embodiments, the micro-retarder array includes a liquid crystal polymer film, wherein the liquid crystal polymer film is configured to modulate polarization along a single spatial axis. In some embodiments, the micro-retarder array includes a liquid crystal polymer film, wherein the liquid crystal polymer film is configured to modulate polarization along a 2-dimensional spatial axis. In one or more embodiments, the performing the second harmonic generation of the purely polarized light includes scanning a focused light of the incident light across the micro-retarder array. The performing the second harmonic generation of the purely polarized light additionally includes detecting the second harmonic generation with a single channel detector, thereby performing the second harmonic generation of the purely polarized light.

Example 2: A method for imaging a sample, wherein the method includes changing a polarization state of a purely polarized light of an incident light striking a micro-retarder array, thereby inducing a changed polarization state of the polarization state. The micro-retarder array is placed in a rear conjugate focal plane of a microscope. Additionally, the method includes projecting the changed polarization state of the polarization state into an object plane of the microscope containing the sample. Furthermore, the method includes translating the sample through a pattern of polarizations induced by the micro-retarder array to interrogate each location of the sample with multiple polarizations. In some embodiments, method includes performing second harmonic generation of the purely polarized light. Moreover, the method includes determining a Stokes and Mueller set of parameters, wherein the Stokes and Mueller set of parameters dictate a linear polarization transfer properties of the sample. The method additionally includes imaging the sample.

In one or more embodiments, the performing the second harmonic generation of the purely polarized light includes scanning a focused light of the incident light across the micro-retarder array. The performing the second harmonic generation of the purely polarized light additionally includes detecting the second harmonic generation with a single channel detector, thereby performing the second harmonic generation of the purely polarized light.

In some embodiments, the determining the Stokes and Muller set of parameters includes scanning a focused light of the incident light across the micro-retarder array. The determining the Stokes and Muller set of parameters further includes detecting a transmitted light through a polarizer with a single channel detector, wherein the transmitted light is transmitted through the sample.

In some embodiments, the determining the Stokes and Muller set of parameters includes illuminating an unfocused light of the incident light across the micro-retarder array. The determining the Stokes and Muller set of parameters additionally includes detecting a transmitted light through a polarizer with a focal point array detector, wherein the transmitted light is transmitted through the sample.

In some embodiments, the micro-retarder array includes a liquid crystal polymer film, wherein the liquid crystal polymer film is configured to modulate polarization along a single spatial axis. In some embodiments, the micro-retarder array includes a liquid crystal polymer film, wherein the liquid crystal polymer film is configured to modulate polarization along a 2-dimensional spatial axis.

Example 3: A method for imaging a sample, wherein the method includes changing a polarization state of a purely polarized light of an incident light striking a micro-retarder array, thereby inducing a changed polarization state of the polarization state. The micro-retarder array is placed in a rear conjugate focal plane of a microscope. The method additionally includes projecting the changed polarization state of the polarization state into an object plane of the microscope containing the sample. Further, the method includes combining image reconstruction algorithms with a single image, thereby producing a combined polarization dependent image, wherein the single image comprises a low frequency power spectrum, wherein the single image is an image of the sample. Moreover, the method includes deconstructing the combined polarization dependent image to produce a plurality of sparsely sampled purely polarized images. The method further includes inpainting, using software, the plurality of sparsely sampled purely polarized images, thereby recovering a set of polarization dependent images. The method additionally includes imaging the sample.

In some embodiments, the micro-retarder array includes a liquid crystal polymer film, wherein the liquid crystal polymer film is configured to modulate polarization along a single spatial axis. In some embodiments, the micro-retarder array includes a liquid crystal polymer film, wherein the liquid crystal polymer film is configured to modulate polarization along a 2-dimensional spatial axis.

Example 4: FIG. 1 is a schematic of the instrumentation for spatially encoded polarization modulation. The Scan Head consists of a resonant scan mirror for fast-axis scanning and a galvanometer mirror for the slow-axis. Placing the microretarder array in the rear conjugate plane enables rapid polarization modulation during beam-scanning imaging.

Measurements were acquired on a custom nonlinear optical microscope described in detail elsewhere. In brief, a Ti:sapphire oscillator (Spectra-Physics MaiTai, ~120 fs, 80 MHz) served as the laser source, with a center wavelength of 800 nm. The micro-retarder array (Thorlabs DPP25-B) was originally designed to serve as a depolarizer by spatially modulating the polarization state across the spatial extent of collimated source. The array consists of a liquid crystal polymer film sandwiched between two silica substrates. The azimuthal angle of the principal axis at each spatial location within the film is independently controllable during manufacturing, with the film thickness designed for half-wave retardance. The array used in the present study consisted of a linearly varying principal azimuthal rotation along a single spatial axis in the array, such that the polarization state is rotated as a function of linear translation across the array.

The micro-retarder array was placed in the rear conjugate plane of the microscope, as illustrated in FIG. 1. The rotation of the unique linear axis of the array was oriented to be coparallel with the slow-scan galvanometer axis in the scan head, which consisted of a combination of resonant scanner (8 kHz, Cambridge Tech) and a galvanometer mirror.

Figure 2:
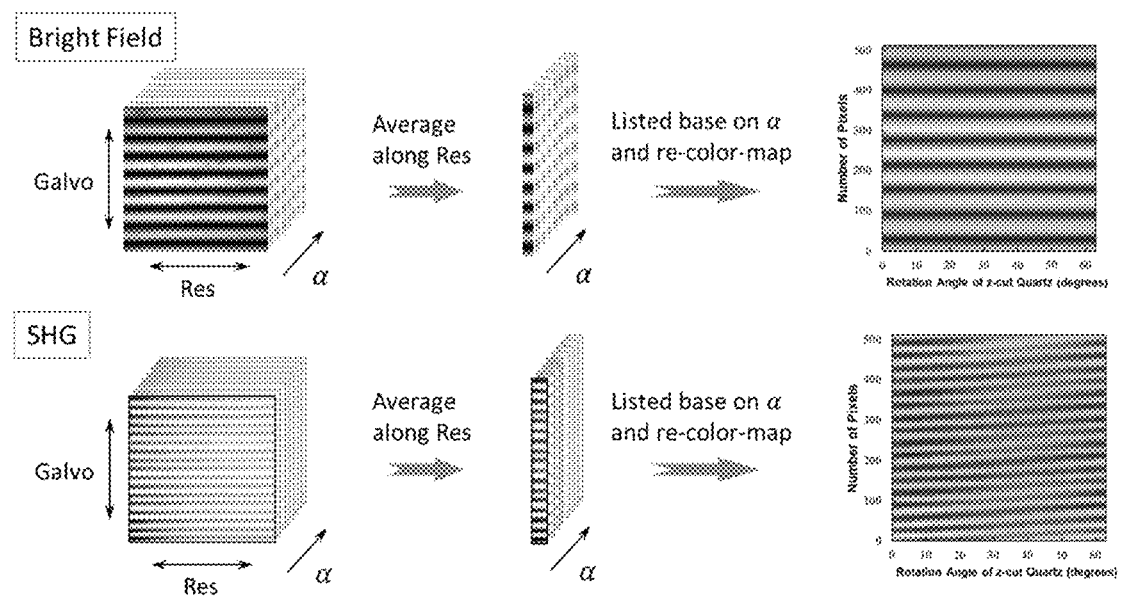
FIG. 2 illustrates experimental measurements of the SHG produced by a sample of known nonlinear optical properties (z-cut quartz), in accordance with one or more embodiments.

Prior to analysis of unknown samples, experimental measurements of the SHG produced by a sample of known nonlinear optical properties (z-cut quartz) are shown in FIG. 2 using the micro-retarder array for spatial modulation of the incident polarization. Raw images of the transmitted infrared (top left) and SHG (bottom left) were acquired at multiple azimuthal rotation angles $\alpha$ for the z-cut quartz. Following acquisition, each image was then signal-averaged along the axis orthogonal to the spatial modulation to produce the maps of modulated intensity as a function of $\alpha$ shown to the right of FIG. 2. Along the z-axis of quartz, the three-fold symmetry results in a linear polarizability matrix that is symmetric, consistent with the absence of birefringence. Consequently, the transmitted infrared beam is not expected to vary significantly with the quartz rotation angle $\alpha$, in excellent agreement with observations. In contrast, the SHG is expected to depend sensitively on both the incident polarization state and the azimuthal rotation angle of quartz, consistent with the bottom-right image of FIG. 2.

Analytical models can connect the observed images to the nonlinear optical properties of z-cut quartz. Fits of the transmitted intensity allow determination of the polarization rotation angle γ of the fundamental beam as a function of position. As the incident polarization is rotated by the angle γ, the n-polarized SHG produced is connected to the laboratory-frame tensor of the sample through the general set of expressions given in Eqs. (1) and (2).

$$I_{L,n}^{2,\omega}(\gamma) = A \cdot \cos^4\gamma + B \cdot \cos^3\gamma \cdot \sin\gamma + C \cdot \cos^2\gamma \cdot \sin^2\gamma + D \cdot \cos\gamma \cdot \sin^3\gamma + E \cdot \sin^4\gamma \quad (1)$$

$$A = |\chi_{nHH}^{(2)}|^2$$

$$B = 4 \cdot Re(\chi_{nHH}^{(2)*} \cdot \chi_{nHV}^{(2)})$$

$$C = 4 \cdot |\chi_{nHV}^{(2)}|^2 + 2 \cdot Re(\chi_{nHH}^{(2)*} \cdot \chi_{nVV}^{(2)})$$

$$D = 4 \cdot Re(\chi_{nVV}^{(2)*} \cdot \chi_{nHV}^{(2)})$$

$$E = |\chi_{nVV}^{(2)}|^2 \quad (2)$$

For the specific case of z-cut quartz, the nonzero local-frame tensor elements are connected by symmetry through the following equalities: $\chi_{yyy} = -\chi_{yxx} = -\chi_{yxy} = -\chi_{xxy}$. Connecting the local frame to the laboratory frame through rotation matrices to produce the laboratory-frame tensor elements given in Eq. (2) yields the following simplified analytical expressions for the fitting coefficients as a function of z-cut quartz rotation angle α.

$$A = E = \cos^2(3\alpha)$$

$$B = -D = 2\sin(6\alpha)$$

$$C = 6\sin^2(3\alpha) - 2 \quad (3)$$

Figure 3:
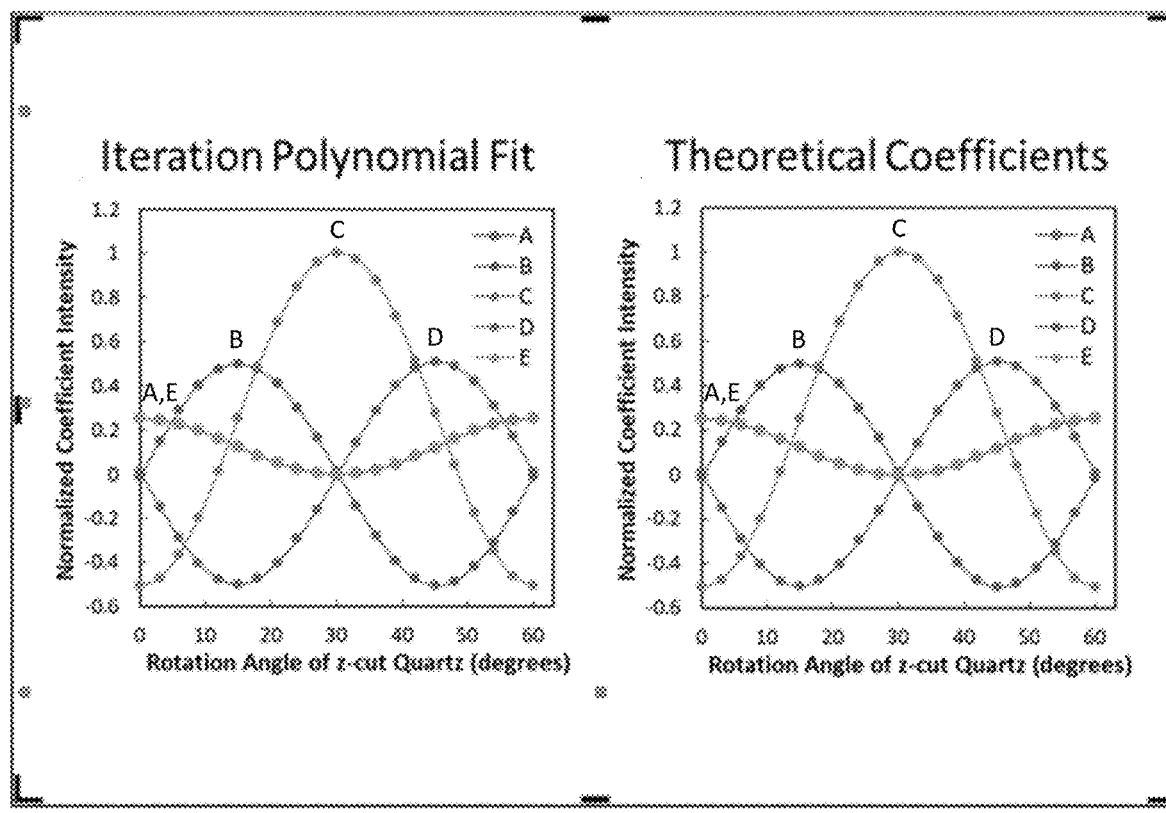
FIG. 3 illustrates comparison between theory and experimental for SHG measurements of a z-cut quartz with known nonlinear optical properties.

The theoretical coefficients predicted by Eq. (3) are shown together with the experimentally measured set of coefficients in FIG. 3. The excellent agreement between the predicted and observed coefficients supports both the validity of the analytical model for describing the nonlinear optical response and the accuracy of the polarization states produced by the micro-retarder array.

Figure 4A:
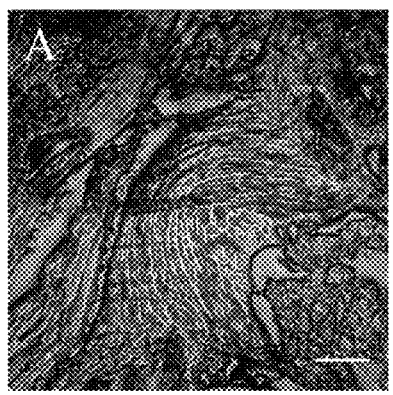
FIG. 4(a) illustrates micro-retarder polarization modulated imaging of a tissue sample containing SHG-active collagen, in accordance with one or more embodiments (bright-field of the transmitted fundamental laser for collagenous tissue section—sum of horizontally and vertically polarized transmittance).
Figure 4B:
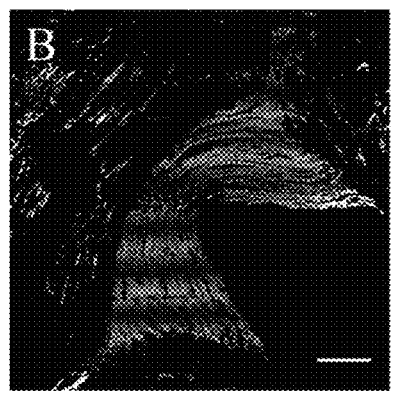
FIG. 4(b) illustrates micro-retarder polarization modulated imaging of a tissue sample containing SHG-active collagen, in accordance with one or more embodiments (the corresponding SHG image for detection of H-polarized light).
Figure 4C:
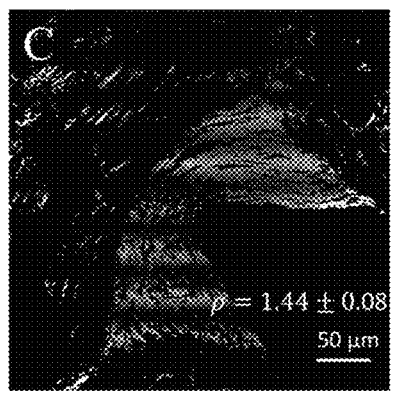
FIG. 4(c) illustrates micro-retarder polarization modulated imaging of a tissue sample containing SHG-active collagen, in accordance with one or more embodiments (the predicted intensity map obtained by a nonlinear fit to the tensor elements of collagen, with an obtained value of the ratio $\rho = \chi_{VVV}/\chi_{VHH} = 1.44$ (0.08)).

Measurements of a spatially heterogeneity collagenous tissue sample are shown in FIG. 4. As in the z-cut quartz measurements, the micro-retarder array modulated the rotation angle of the linearly polarized incident light across the field of view. Separate images are shown for the laboratory-frame horizontally and vertically polarized SHG. The local orientation of the collagen fiber axis varies significantly as a function of position, such that the trends shown in FIG. 3 for z-cut quartz can be accessed in a single field of view without the need for sample rotation. The local-frame orientation of the collagen fibers was independently determined by OrientationJ (a plug-in for ImageJ), which has been shown previously to yield good agreement with orientation determined by SHG polarization measurements. Reference frame rotation between the local and laboratory frames as detailed in previous work enables determination of the collective set of tensor elements for collagen that are most consistent with the combined polarization-dependent SHG intensities. Optimization of the local-frame tensor elements proceeded through minimization of the sum of squared deviations between predictions and observations in the images as described in detail elsewhere.

The measurements reported herein were centered on single-shot measurements to determine the ensemble-averaged tensor elements most consistent with all the collagen present within the field of view. The relative tensor elements produced by collagen through single-shot image analysis ($\chi_{VVV}/\chi_{VHH} = 1.44 \pm 0.08$) using the micro-retarder array agree reasonably well with those reported previously.

While the preceding analysis single-shot analysis implicitly assumed identical local-frame tensor elements for collagen, previous studies have indicated the presence of significant variation in the tensors measured for different microstructures of collagen. In such instances, access to the local-frame tensors at each location to generate a $\chi^{(2)}$ tensor map can potentially be accessed using the micro-retarder array simply through sample translation. Translating the sample through the fixed polarization pattern results in polarization modulation of the incident polarization state at the same locations within the sample. This analysis is beyond the scope of the present study, but raises the intriguing possibility for single-pixel polarization-dependent mapping by taking advantage of automated sample translation capabilities already integrated present in most commercial nonlinear optical microscopes.

A micro-retarder array enables spatially patterned polarization modulation in nonlinear optical microscopy. In measurements of a spatially uniform z-cut quartz sample, agreement was observed between the predicted and observed SHG intensity as a function of position. This agreement supports both the analytical theory predicting the laboratory-frame response in terms of the local-frame nonlinear optical activity and the precision of polarization modulation within the field of view. At a fixed location within the field of view, polarization modulated measurements can be acquired by translating the sample. Alternatively, pooling data from multiple pixels allows single-shot polarization analysis of objects spanning multiple pixels in dimension. The approach described herein requires the addition of only two spatially fixed optics (micro-retarder array and a fixed polarizer) to an existing SHG/TPEF microscope to enable precise polarization modulation measurements. These initial proof of concept studies support the application of polarization modulation using a micro-retarder array for selective detection of crystals and for discrimination between single- and multi-domain crystals prior to diffraction analysis.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A method for imaging a sample, wherein the method comprises:
changing a polarization state of a purely polarized light of an incident light striking a micro retarder micro-retarder array, thereby inducing a changed polarization state of the polarization state, wherein the polarization state is rotated as a function of a translation across the micro-retarder array to form the changed polarization state, wherein the micro-retarder array is placed in a rear conjugate focal plane of a microscope;
projecting the changed polarization state of the polarization state into an object plane of the microscope containing the sample;
translating the sample through a pattern of polarizations induced by the micro-retarder array to interrogate each location of the sample with multiple polarizations;
performing second harmonic generation of the purely polarized light; and
imaging the sample.

2. The method of claim 1, wherein the micro-retarder array comprises:
a liquid crystal polymer film, wherein the liquid crystal polymer film is configured to modulate polarization along a single spatial axis.

3. The method of claim 1, wherein the performing the second harmonic generation of the purely polarized light comprises:
scanning a focused light of the incident light across the micro-retarder array; and
detecting the second harmonic generation with a single channel detector, thereby performing the second harmonic generation of the purely polarized light.

4. A method for imaging a sample, wherein the method comprises:
directing a purely polarized light toward a micro-retarder array;
changing a polarization state of the purely polarized light striking the micro-retarder array, thereby inducing a changed polarization state of the polarization state, wherein the polarization state is rotated as a function of the translation of the purely polarized light across the micro-retarder array;
projecting the changed polarization state of the polarization state into an object plane of the microscope containing the sample;
translating the sample through a pattern of polarizations induced by the micro-retarder array to interrogate each location of the sample with multiple polarizations;
determining a Stokes and Mueller set of parameters, wherein the Stokes and Mueller set of parameters dictate a linear polarization transfer properties of the sample; and
imaging the sample.

5. The method of claim 4, wherein the determining the Stokes and Mueller set of parameters comprises:
scanning a focused light of the incident light across the micro-retarder array; and
detecting a transmitted light through a polarizer with a single channel detector, wherein the transmitted light is transmitted through the sample.

6. The method of claim 4, wherein the determining the Stokes and Mueller set of parameters comprises:
illuminating an unfocused light of the incident light across the micro-retarder array; and
detecting a transmitted light through a polarizer with a focal point array detector, wherein the transmitted light is transmitted through the sample.

7. A method for imaging a sample, wherein the method comprises:
changing a polarization state of a purely polarized light of an incident light striking a micro-retarder array, thereby inducing a changed polarization state of the polarization state, wherein the micro-retarder array includes a linearly varying principal azimuthal rotation of polarization defined along a single spatial axis in the micro-retarder array, and wherein the micro-retarder array is placed in a rear conjugate focal plane of a microscope;
projecting the changed polarization state of the polarization state into an object plane of the microscope containing the sample;
combining image reconstruction algorithms with a single image, thereby producing a combined polarization dependent image, wherein the single image comprises a low frequency power spectrum, wherein the single image is an image of the sample;
deconstructing the combined polarization dependent image to produce a plurality of sparsely sampled purely polarized images;
inpainting, using software, the plurality of sparsely sampled purely polarized images, thereby recovering a set of polarization dependent images; and
imaging the sample.

8. The method of claim 4, wherein the determining the Stokes and Mueller set of parameters comprises:
scanning a focused light of the incident light across the micro-retarder array; and
detecting a transmitted light through a polarizer with a single channel detector, wherein the transmitted light is transmitted through the sample.

9. The method of claim 1, wherein the micro-retarder array comprises:
a liquid crystal polymer film, wherein the liquid crystal polymer film is configured to modulate polarization along a 2-dimensional spatial axis.

10. The method of claim 4, further comprising:
performing second harmonic generation of the purely polarized light; and
imaging the sample.

* * * * *